Patented Aug. 21, 1934

1,970,628

UNITED STATES PATENT OFFICE 1,970,628

VALVE OPERATING MECHANISM

Eugene L. Schellens, Ridgewood, N. J., assignor to C-S Engineering Company, Englewood, N. J., a corporation of Delaware Application October 6, 1931, Serial No. 567,206

16 Claims. (Cl. 137—140)

This invention relates to valve operating mechanisms and is particularly concerned with an operating mechanism for a valve disposed within a chamber which is normally subject to fluid pressure and from which the operating connection must be extended to a point exterior of the chamber for actuation by the desired controlling means.

Some of the more important objects of the invention will become more apparent from a consideration of the following general discussion of types of valve actuating mechanisms heretofore employed in structures of the general type outlined above.

It should first be borne in mind in this connection that, in the type of valve arrangements referred to, a valve is normally positioned within a chamber which is subject to fluid under pressure, for example, steam. It should further be noted that where it is desired to actuate the valve from a point exterior of the fluid pressure chamber it, of course, becomes necessary to extend an actuating connection through a wall of the chamber.

Heretofore, relatively large and flexible fibrous or soft metal discs have been disposed in the walls of such chambers. With these arrangements the operating connection was extended through a diaphragm to actuate the valve by a movement thereof generally perpendicular to the plane of the diaphragm.

As alternatives, the prior art has also employed the so-called "bellows" type of collapsible diaphragms or some type of packed or "stuffed" rotating or axially movable valve operating connection.

As is well recognized in this art, these various types of valve actuating connections are all subject to various difficulties which need not be considered in detail herein although, by way of example, it might be mentioned that, especially where high pressures are employed, leakage of the fluid pressure and sticking very frequently result.

On the other hand fabric, rubber or fibrous diaphragms are entirely unsuitable for certain pressure conditions and, still further, the relatively soft metals which have been employed in the "bellows" or flat type of diaphragms are often subject to very severe corrosion.

While various features of the present invention are applicable to control mechanisms having valves and the like of a wide variety of types, at the same time, it should be observed that the specific structure herein disclosed is especially adapted for use as an emergency control mechanism. That is, certain features of the invention herein disclosed are especially suitable for use in emergency trips, stops or similar control devices and, in this connection, it should be noted that, where an emergency valve located in a fluid pressure chamber, is arranged for actuation by an operating connection extended to a point exterior of the chamber, considerable difficulty has been encountered heretofore as a result of corrosion, pitting and the like, so that former devices have failed in the very emergencies for which they were provided. This matter will be still more apparent when it is considered that, in an emergency mechanism, the operating connection and associated parts normally remain idle and unused for long periods of time. This allows the parts to accumulate scale (especially in a diaphragm of the bellow type) or to become severely pitted (more particularly in the type of mechanism which includes an operating shaft or element adapted to slide through or rotate in a packing).

The present invention has in view eliminating all of the foregoing disadvantages and difficulties by the use of a device which is relatively simple, so that its manufacture and installation are neither complicated nor expensive.

Before proceeding with a more or less detailed description of the nature of this invention, attention is called to the fact that the arrangement provided is especially suitable for use in a valve structure which is arranged for actuation only relatively infrequently. By way of example, a structure of the type to which the present invention is particularly suitable, is one in which the actuating mechanism takes the form of an emergency trip designed to operate only when the operation of some of the associated parts is impaired or when some of the parts themselves become damaged. It is desirable, of course, that such emergency trip mechanisms should be positive in their action at such times as they are operated, and heretofore in this art considerable difficulty has resulted from the use of various types of actuating mechanisms above referred to since corrosion, accumulation of scale, pitting and the like frequently occur where the parts are not in constant use.

More specifically, this invention contemplates the use of a relatively small diameter metallic diaphragm, the said diaphragm being composed of a material such as Monel metal. In this way, the difficulties heretofore encountered by virtue of corrosion and the accumulation of scale and the like are substantially eliminated, especially where the parts are normally subjected to the action of steam.

Furthermore, instead of following the practice of the prior art (arranging the valve actuating connection for movement substantially perpendicularly to the diaphragm) I provide an operating connection which is arranged to actuate the valve by a rocking movement the center of which lies in or at least closely adjacent to the plane of the diaphragm itself. In this manner, and with a suitable valve operating connection extended laterally from the diaphragm and internally of the chamber, by a very slight irregular transverse deformation of the diaphragm in an area or portion intermediate its edges, I may obtain quite large valve movement.

It should further be noted that, in accordance with this invention, the diaphragm itself positions or provides the fulcrum point for the valve movement, this being of considerable importance since it reduces complication in the parts and also provides a sturdy construction.

The invention also has in view various other more or less detailed objects and advantages all of which will appear more clearly hereinafter from consideration of the following description taken with the accompanying drawings which illustrate one embodiment or application of the invention.

Figure 1:
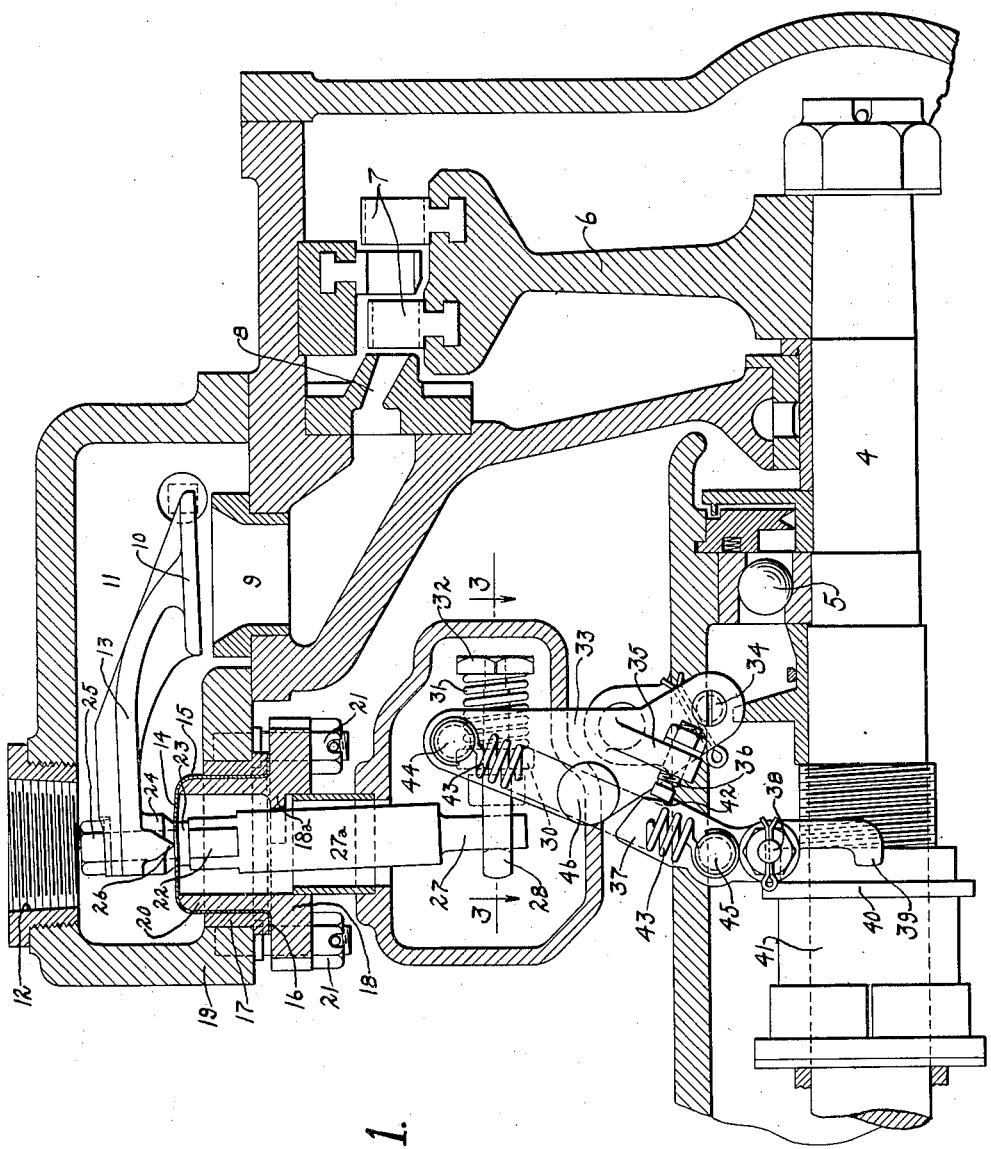
Figure 1 is a vertical sectional view through a portion of a turbine motor arranged for steam operation, the view including an emergency control valve for the turbine, the actuating mechanism therefor, as well as other associated parts.

Referring first to Figure 1, attention is called to the showing of the turbine or motor shaft at 4. This shaft may be suitably journaled as indicated at 5 and is provided with a runner 6 having blades or buckets 7 against which the operating fluid is projected through a nozzle 8. The nozzle 8, in turn, communicates with a valve port 9 which is adapted to be controlled by the valve 10. In this embodiment of the invention, valve 10 is an emergency shut-off valve only, normal control of the turbine being by a separate mechanism controlling the admission of steam through connection 12.

This valve is enclosed within a chamber 11 which, as noted, is supplied with the operating fluid through a connection 12. The valve stem or support 13 is preferably extended laterally from the valve itself and, at its end, is disposed over a diaphragm 14 which is formed at one end of a cylindrical part 15. These portions 14 and 15 constitute a cup member, preferably made of Monel metal, and the cup is further provided with an external flange 16 which is arranged to be gripped between the collar or ring 17 and a cooperating part 18. The ring 17, of course, is snugly fitted within a wall 19 of the chamber 11 and the securing device 18 has a cylindrical portion 20 extended into the cylinder 15 in order to reenforce the latter and provide a fluid tight connection in the chamber wall. Suitable nut and bolt devices 21 serve to tighten the device 18 by reaction against a portion of the chamber wall 19.

The valve actuating connection 22 is extended through a central aperture in the diaphragm 14 and is operatively connected with the stem 13. A fluid tight joint is provided at this point by means of the gripping parts 23 and 24, arranged at opposite sides of the diaphragm. A nut 25 serves to complete the connection with the part 22 as well as to rigidly grip the diaphragm between the abutting members 23 and 24. In order to relieve the diaphragm 14 of the pressure and also of the weight of the valve itself as well as the immediately associated operating parts, a knife edge 26 is disposed above the diaphragm and extended transversely thereacross so that, in effect, the valve and the actuating parts are supported on the cylindrical reenforcing part 20 of the securing device 18. The knife edge 26, furthermore, is disposed along the axis about which the rocking movement occurs during valve actuation.

Figure 2:
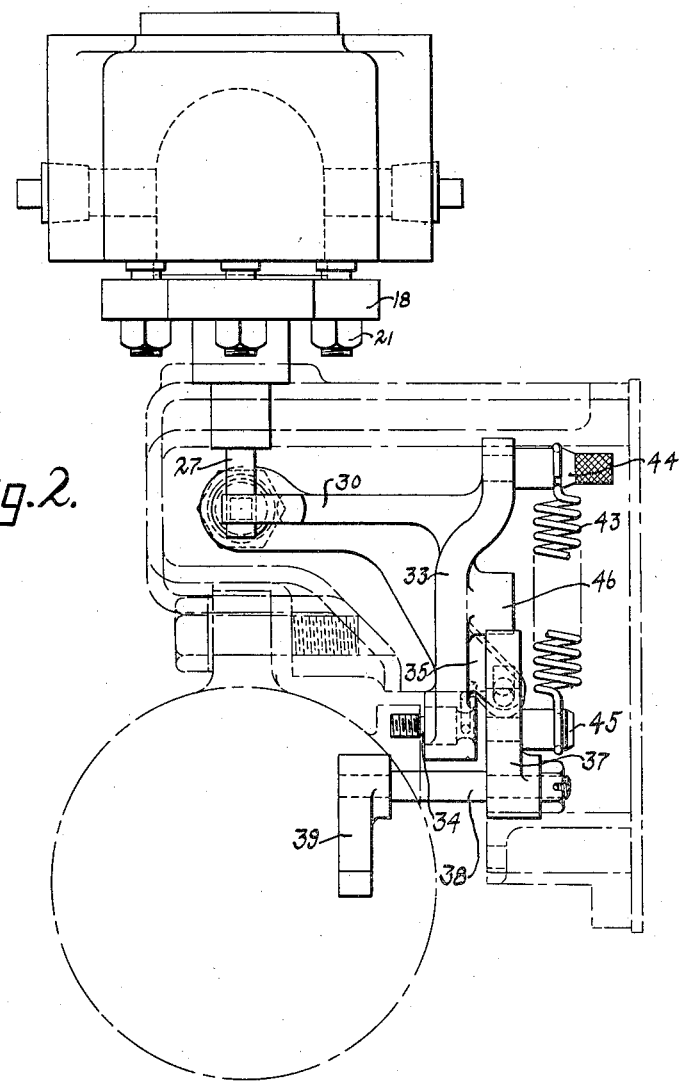
Figure 2 is an elevational view taken from the left of Figure 1, the view being particularly arranged to illustrate some of the valve actuating parts.

The connection 22 is extended downwardly substantially to terminate in a part 27 which serves to cooperate with a loop or bracket 28 mounted at one end of the spindle 29. A cooperating actuating part 30 is apertured to pass the spindle 29 and, at one side thereof, is arranged to abut against one leg of the yoke 28. At its other side, a spring 31 is disposed for reaction between the part 30 and a nut 32 threaded on to the end of the spindle 29. The part 30 is extended laterally as indicated in Figure 2 and mounted for movement with the pivoted lever 33, the pivot for this lever being indicated at 34. The lever 33, in turn, carries a stop or lug 35 having an adjusting nut device 36 associated therewith, the latter being disposed for contact with a second lever 37 which is mounted for rotation with the shaft 38. The shaft last mentioned may be provided with any suitable bearing and also carries an additional crank or lever 39 which is arranged to contact with a part 40 of a governor mechanism 41, the latter being arranged peripherally of the turbine or motor shaft 4. At the point of contact of the adjustable bolt device 36, the lever 37 is notched as at 42 so that upon movement of the lever 37 to the left, as viewed in Figure 1, the device 36 is disengaged from the notch 42 and the lever 33 may then pivot to the left and downwardly about the axis 34. A spring 43 is secured at one end to the lever 33 as at 44, and at its other end to the lever 37 as at 45. An additional abutment 46 is also carried by the lever 33 and disposed thereon in such manner that, upon movement of the lever 37 counterclockwise about its pivot 38 to release the device 36 from the notch 42, its action (that of the abutment 46) is such as to further displace the lever 37 to the left (as viewed in Figure 1) and to come into a position to one side of the lever last mentioned and thus prevent automatic return of the mechanism to the position illustrated in Figure 1 after it has been tripped.

To clarify the entire operation of the trip mechanism, it should be borne in mind first that the governor device 41 is so arranged as to cause an axial movement of the part 40 to the right (see Fig. 1) upon an increase in speed of the motor or turbine shaft 40 beyond the normal or desired rate. Thus, the invention has here been illustrated and described as applied to a structure which is especially adapted for use as an emergency trip, although it is to be understood that various features of the valve actuating mechanism itself may be applied with equal advantage to numerous other valve or structural arrangements.

Figure 3:
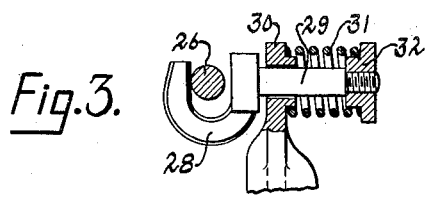
Figure 3 is a detail view of a portion of the actuating mechanism.

To continue with the mode of operation of the particular trip mechanism herein illustrated, assume now that the governor part 40 is displaced to the right. This displacement moves the lever 39 to the right and thus causes the lever 37 to be moved to the left about the pivot point 38 so that the device 36 is disengaged from the notch 42. Upon such disengagement of the device 36 the reaction of spring 43, which is extended at a considerable angle to the lever 33, in turn, causes a counterclockwise movement of the lever 33 about its pivot 34 with the result that the abutment or stop 46 moves downwardly at the right hand side of the lever 37 and, at the same time, causes the extension 30 of the lever 33 (see Fig. 2) to move to the left as viewed in Figures 1 and 3. This movement, of course, actuates the valve operating stem or connection 27 similarly to the left, so that the rocking movement of the diaphragm 14 about the knife edge 26 as a center closes the valve 10 and thus shuts off the supply of steam to the motor or turbine runner 6. In the preferred arrangement, furthermore, as illustrated in the drawings, the valve is so arranged as to provide an adequate passage when in its open position and yet to be seated tightly, under the influence of steam pressure in the chamber 11, when in closed position.

These various parts, therefore, are so arranged as to retain the valve in closed position, after being tripped, until they are reset by hand. The spring 31 associated with the spindle 29 serves to maintain the engagement of the device 36 with the notch 42 when the parts occupy their normal operating positions, i. e., the positions illustrated in Figure 1.

The structure is also provided with positive means for preventing abnormal or undue deformation of the diaphragm 14 in either direction. In closing, the movement of the operating connection and the diaphragm is positively limited by seating of the valve while in opening, the stop 18a, associated with the securing device 18, contacts with the shank portion 27a and thus limits movement of the depending connection 27 to the right.

It is also to be noted that the loop or bracket 28 in cooperation with the spring 31 serves the purpose of yieldingly holding the shank 27a against the stop 18a. Thus, even though there be inaccuracies in machining, the stop will be engaged by the shank when the valve is in open position. Also, in the event of too great a pressure difference between the top and bottom portion of the valve, the valve can close, compressing spring 31 without bending or distorting any of the parts.

According to the foregoing, the present invention provides a novel type of diaphragm valve actuating mechanism, the said mechanism being of such characteristics as to permit of easy and positive operation even though the parts come into operation only relatively seldom or after long periods of use. While the diaphragm and the associated actuating parts per se are especially adapted for use in a valve structure of the type just referred to, it will be apparent to those skilled in the art that it may readily be employed with equal advantage in numerous other arrangements of parts. In this connection it is noted that the diaphragm may readily be composed of a non-corrodible metal so that its life is very great indeed and, at the same time, the wear and deterioration is very slow, since the deformation of the diaphragm necessary to satisfactory operation need only be very slight.

The structure disclosed is further of advantage over structures employed in prior practice since the diaphragm is not subject to the accumulation of scale in a manner which will interfere with its satisfactory operation. In comparison with this, attention is called to the fact that in the "bellows" type of operating connection, especially where the mechanism is actuated only relatively infrequently, any material accumulation of scale in the grooves or recesses between the bellows is likely to impair if not completely destroy proper operation.

Another advantage of the use of the diaphragm and operating mechanism of this invention resides in the fact that the diaphragm is "self-cleaning" in character so that, even if some scale accumulates from time to time, the rocking movement of the diaphragm during valve actuation cracks off or loosens the scale and thus ensures positive operation in emergencies.

It is further to be observed that, in view of the small deformation or movement necessary at the diaphragm itself, the latter may be made of relatively small diameter and thus of very great strength as compared to the strength of the relatively large diameter diaphragms necessarily employed where movement of the operating connection extends in a path generally transverse of the diaphragm.

Finally, it is noted that the trip mechanism employed in association with the governor is very simple in construction and yet positive in operation. These parts are also arranged so that after once being tripped in an emergency, the motor cannot be again started until the trip proper is reset by hand. This, of course, frequently avoids considerable damage to associated parts or mechanisms.

What I claim is:—

1. In combination with a valve chamber having a valve therein, a valve actuating connection extended from the interior of the chamber to the exterior thereof, and a diaphragm device through which said connection is extended, the diaphragm device including a cylindrical part extended through a chamber wall and a head or diaphragm portion cooperating with said connection, together with means for securing the device in proper position including reenforcing means engaging said cylindrical portion.

2. In combination with a valve chamber having a valve therein, a valve actuating connection extended from the interior of the chamber to the exterior thereof, and a diaphragm device through which said connection is extended, the diaphragm device including a cylindrical part extended through a chamber wall and a head or diaphragm portion cooperating with said connection, together with means for securing the device in proper position including reenforcing means engaging said cylindrical portion and arranged to tighten the device against a portion of the associated chamber wall.

3. Operating mechanism for a valve including a valve member, a valve operating member, a diaphragm, means for securing said members together with the diaphragm secured therebetween, and means for mounting said connected members for rocking movement about an axis lying substantially in the general plane of the diaphragm through the medium of said diaphragm, said valve member having knife edge portions associated with the diaphragm and its mounting to relieve pressure strains on the diaphragm.

4. Operating mechanism for a valve including a valve member, a valve operating member, a diaphragm, means for securing said members together with the diaphragm secured therebetween, means for mounting said connected members for rocking movement about an axis lying substantially in the general plane of the diaphragm through the medium of said diaphragm, and knife edge means for reinforcing said diaphragm along said axis.

5. A valve structure including a fluid pressure chamber having a valve port therein; a valve arranged to cooperate with said port to control flow therethrough; valve operating mechanism including an operating connection extended from an external point through an opening in the chamber to the interior thereof to actuate said valve, a diaphragm carried by said connection and arranged to constitute a closure for said opening and means extending within the confines of said chamber cooperating with the diaphragm to provide a pivot for said connection.

6. A valve structure including a fluid pressure chamber having a valve port therein; a valve arranged to cooperate with said port to control flow therethrough; valve operating mechanism including an operating connection extended from an external point through an opening in the chamber to the interior thereof to actuate said valve, a diaphragm carried by said connection and arranged to constitute a closure for said opening, and knife edge means associated with said diaphragm so as to extend along the axis of pivot and relieve the diaphragm of pressure strains.

7. Operating mechanism for a valve including a member having a cylindrical portion, a diaphragm portion at one end of the cylindrical portion, and a flanged portion at the other end of the cylindrical portion, valve actuating means secured to said member at the diaphragm portion thereof and means for securing said member to a support at the flanged portion thereof, said valve actuating means when moved causing deformation of said diaphragm portion.

8. A valve structure including a fluid pressure chamber having a valve port therein; a valve arranged to cooperate with said port to control flow therethrough; valve operating mechanism including an operating connection extended from an external point through an opening in the chamber to the interior thereof to actuate said valve; a member arranged to constitute a closure for said opening, said member having a cylindrical portion adapted to fit said opening in the chamber, a flanged portion at the outside end of said cylindrical portion, and a diaphragm portion at the inside end of said cylindrical portion; means for securing said operating connection to the diaphragm portion of said member, and means cooperating with the flanged portion of said member for securing it to the casing exterior of said opening.

9. Operating mechanism for a valve including a cup-shaped member having a diaphragm portion, a reinforced cylindrical portion, and a flanged portion, valve actuating means extended from the diaphragm portion at opposite sides thereof, and means for securing said cup-shaped member in place at the flange portion thereof.

10. Operating mechanism for a valve, said mechanism including a diaphragm, a valve rod extended through the diaphragm, means supporting said diaphragm for angular deformation to provide for rocking movement of the valve rod, stop means for limiting said rocking movement, means for actuating said rod including an actuating member, a link member located between said valve rod and said actuating member, and spring means between said actuating member and link member, said spring means reacting from the actuating member to yieldingly hold the valve rod against the stop means.

11. Operating mechanism for a valve, said mechanism including a diaphragm, a valve rod extended through the diaphragm, means supporting said diaphragm for angular deformation to provide for rocking movement of the valve rod, means for imparting movement to the valve rod and means connecting said movement imparting means to said valve rod including a connecting link and spring means located between said link and said movement imparting means and reacting from the latter.

12. Operating mechanism for a valve, said mechanism including a diaphragm, a valve actuator, a valve rod carried by and extending thru said diaphragm, and means for connecting the actuator and valve rod including a link member and a spring located between said link member and said actuator.

13. A valve structure including a fluid pressure chamber having a valve port therein; a valve arranged to cooperate with said port to control flow therethrough; valve operating mechanism including an operating connection extended from an external point through an opening in the chamber to the interior thereof to actuate said valve, a diaphragm carried by said connection and arranged to constitute a closure for said opening, means extending within the confines of said chamber cooperating with the diaphragm to provide a pivot for said connection, and a valve actuator yieldably connected to said operating connection.

14. Operating mechanism for a valve, said mechanism including a disc type diaphragm, a valve actuator, means carried by and extending thru said diaphragm for connecting the actuator and valve, said connecting means having knife edge portions supporting the diaphragm to relieve pressure strains thereon.

15. Operating mechanism for a valve, said mechanism including a disc type diaphragm, a valve actuator, a bell crank connection between said actuator and valve, said connection being secured to and having its fulcrum at the diaphragm with one arm at one side of and the other arm at the opposite side of the diaphragm, the arm at the valve side of said diaphragm having knife edge portions supported to relieve the diaphragm of pressure strains.

16. Operating mechanism for a valve, said mechanism including a diaphragm, a valve actuator, and means yieldably connected to said actuator for connecting the actuator and valve, including a valve rod extending thru said diaphragm, a link member between said rod and actuator, and a spring located between said link member and actuator.

EUGENE L. SCHELLENS.